Dec. 29, 1953   M. A. ELLIOTT   2,664,327
PISTON WRIST PIN ASSEMBLY
Filed Feb. 15, 1951
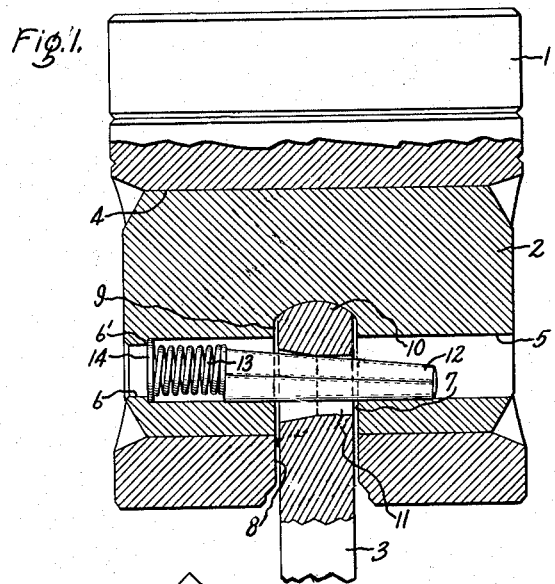
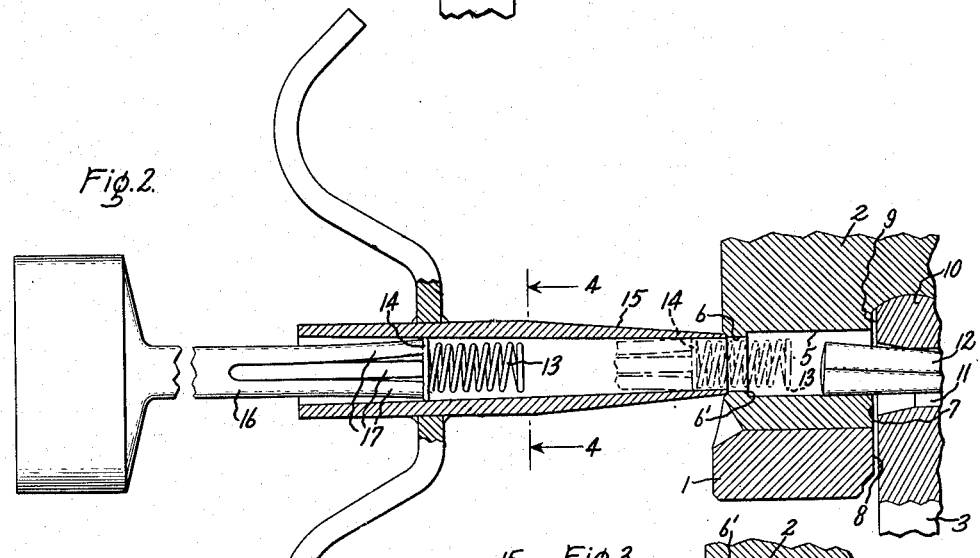
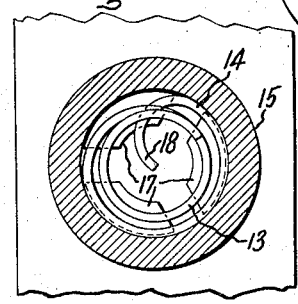
Inventor:
Marvel A. Elliott,
by William B. Edwards, Jr.
His Attorney.

Patented Dec. 29, 1953

2,664,327

UNITED STATES PATENT OFFICE 2,664,327

PISTON WRIST PIN ASSEMBLY

Marvel A. Elliott, Erie, Pa., assignor to General Electric Company, a corporation of New York Application February 15, 1951, Serial No. 211,071

2 Claims. (Cl. 309—19)

My invention relates to compressors and the like, more particularly to the wrist pin and connecting rod assemblies for pistons of compressors and the like.

In many presently used compressors, a wrist pin and connecting rod assembly is employed which includes a wrist pin positioned within an opening in a piston, and a spring biased tapered key disposed in a longitudinal passage in the wrist pin for connecting a connecting rod to the wrist pin with some form of self-aligning or self-adjusting action. Heretofore, the spring member which biases the tapered key, by engagement with the larger end surface of the key, has been held in compressed condition within the longitudinal passage by some separate member, such as a screw plug in threaded engagement with the walls of the longitudinal passage, or an arcuate spring clip snapped into a peripheral groove around the piston so as to cover the entrance to the longitudinal passage.

The use of a screw plug involves the relatively costly operation of threading the plug and the inner surface of the longitudinal passage and also causes difficulty in the assembly operation, since the spring must be compressed and held so while the screw plug is started into its threaded engagement.

The use of an arcuate spring clip involves the relatively high cost of providing the clip and machining a groove in the lower portion of the piston. The clip and biasing spring are difficult to assemble since the biasing spring must be compressed and held so while the spring clip is snapped into its receiving groove. Extreme care must be used in this assembly operation because any "set" caused in the spring clip will make it loose fitting enough so that it may rotate within the groove and release the biasing spring when the discontinuity between its extremities reaches the entrance to the longitudinal passage.

It is, therefore, an object of my invention to provide an improved wrist pin and connecting rod assembly.

It is another object of my invention to provide simpler and less costly retention means for a compressed biasing spring in a wrist pin and connecting rod assembly.

In carrying out the objects of my invention, a wrist pin and connecting rod assembly including a tapered key is provided with a biasing spring for the tapered key which is formed with at least one turn on one extremity thereof having a diameter greater than the diameter of the other turns. A longitudinal passage through the wrist pin is formed to include in one end thereof a portion of reduced diameter providing a shoulder within the passage. When assembled, the tapered key is disposed within the longitudinal passage of the wrist pin, passing through and wedging in an opening in the connecting rod. The key is biased by the compressed spring to fasten the connecting rod and wrist pin securely, with the turn at the smaller end of the spring bearing upon the surface of the larger end of the tapered key and the larger turn of the spring bearing upon the shoulder.

The novel features and scope of my invention are pointed out with more particularity in the appended claims. For a better understanding of my invention, however, together with further objects and advantages thereof, reference should be had to the following description together with the accompanying drawing.

In the drawing, Fig. 1 is a sectional elevational view of a piston together with the wrist pin and connecting rod assembly of my invention; Fig. 2 is a sectional elevational view illustrating a method of assembling my invention; Fig. 3 is similar to Fig. 2, further illustrating the method of assembly; and Fig. 4 is a sectional view taken along line 4—4 in Fig. 2.

In Fig. 1, I have shown a compressor piston 1 with an associated wrist pin and connecting rod assembly including a wrist pin 2 and a connecting rod 3, which is only partly shown. The piston 1 is provided with a transverse passage 4 for receiving the wrist pin 2. In order to provide for connection of the connecting rod 3, the wrist pin 2 is provided with a longitudinal passage 5, including in one end thereof a portion 6 of reduced diameter providing a shoulder 6', and a transverse passage 7 extending from passage 5 downwardly through the bottom of the wrist pin. The bottom portion of the piston 1 is provided with a large opening 8 for receiving the connecting rod 3 and permitting lateral movement of the connecting rod therein during operation of the compressor. The wrist pin 2 is provided with an internal recess 9 located in line with passage 7 for receiving the upper end 10 of the connecting rod. An opening 11 provided in the connecting rod, which may be chamfered as shown, is then in general alignment with passage 5 as shown.

In order that the piston 1, wrist pin 2, and connecting rod 3 may be maintained in assembled relationship, a tapered key 12 is disposed within passage 5 extending through opening 11. A spring 13 is disposed in compressed condition within passage 5 for urging key 12 toward the right as shown in the drawing, so that the key is in contact with the upper surface of opening 11 and the lower surface of passage 5. Thus, on the upward stroke of the piston, force is transmitted from end 10 directly to the upper surface of recess 9 and on the downward stroke of piston, force is transmitted from the upper surface of opening 11 through key 12 to the lower surface of passage 5. As any wear occurs between the connecting rod 3 and the wrist pin 2, the slack is immediately taken up by movement of key 12 to the right under the biasing force of spring 13.

One or more of the turns at one end of spring 13 (one turn 14 at the left end being illustrated) are of diameter substantially greater than the diameter of the remainder of the turns so that spring 13 is held compressed by its smaller end turn bearing against the larger end surface of key 12 and by its larger end turn 14 bearing against the shoulder 6'. The size of key 12 is such that it may easily be inserted into the entrance to passage 5 provided by the reduced diameter portion 6. The turns of spring 13, except turn 14, are also of such diameter that the right end of the spring may also be inserted into that entrance. However, turn 14 is of a diameter larger than the entrance provided by portion 6 in order that it will bear against shoulder 6' and hold spring 13 under compression after assembly, the method of which is described hereafter.

A method of assembly for component parts such as those included in the wrist pin and connecting rod assembly of my invention is best described by way of example with reference to Figs. 2, 3 and 4, and is as follows:

Wrist pin 2 is, of course, inserted into passage 4 as illustrated in Fig. 1 and the connecting rod 3 is inserted through opening 8 and passage 7 so that its end 10 rests in recess 9. Key 12 is then inserted, its smaller end first, through the entrance to passage 5 provided by portion 6 until it engages connecting rod 3 as illustrated. Spring 13 is next placed, smaller end first, in a tapered sleeve, such as sleeve 15, which is placed with its smaller end in abutting alignment with the entrance to passage 5 as shown by Figs. 2 and 3. A radially compressible shaft-like tool, such as one including a hollow split shaft 16 having flexible tangs 17 on one extremity thereof, is then used to push spring 13 through sleeve 15. The smallest inside diameter of sleeve 15, located at the right end thereof, is substantially the same size as the diameter of the entrance provided by portion 6, as shown in the drawing. On the other hand, the largest inside diameter of sleeve 15, located at the left end thereof, is at least slightly greater than the diameter of turn 14 when uncompressed. The shaft 16, at the flared extremity formed by tangs 17 when uncompressed, is substantially the same diameter as the end turn 14 when uncompressed. Thus, insertion of shaft 16 into sleeve 15 against spring 13 causes the tangs 17 to engage the turn 14, as shown by the solid lines of Fig. 2 and illustrated more clearly by Fig. 4. Pushing shaft 16 further into sleeve 15 advances the spring 13 and decreases the diameter formed by tangs 17 and the end turn 14, as shown by the dashed lines of Fig. 2. The spring 13 is thus pushed into passage 5 and turn 14 is radially compressed enough for it to enter the entrance provided by portion 6. Once past the portion 6, the end turn 14 expands to engage the surface formed by shoulder 6' as illustrated by Fig. 3. The spring, by this method, is thus easily assembled into the compressed position hereinbefore described.

The larger end turn 14 of spring 13 may be made to include an inwardly bent tail-like portion 18, as shown in Fig. 4, which is one extremity of the wire forming spring 13. Tail-like portion 18 affords easy disassembly of the wrist pin and connecting rod assembly, the disassembly method being simply to reach through the entrance to passage 5 and grasp portion 18 with a pair of needle-nose pliers; to turn portion 18 in a counterclockwise direction (as shown in Fig. 4) so that turn 14 is reduced in diameter and no longer engages shoulder 6'; and then to pull spring 13 from passage 5. The tapered key 12 may then be pushed out of passage 5 and the connecting rod 3 pulled from opening 8.

My invention, therefore, provides a new and simpler means for spring biasing a tapered key in a wrist pin and connecting rod arrangement, which means is adapted for facilitating assembly and disassembly of the arrangement.

While the present invention has been described by reference to a particular embodiment thereof, it will be understood that modifications may be made by those skilled in the art without actually departing from the invention. I, therefore, aim in the appended claims to cover all such variations as come within the true spirit and scope of the foregoing disclosure.

What I claim as new and desire to secure by Letters Patent of the United States is:

1. In a wrist pin and connecting rod assembly for compressors and the like, a wrist pin having a longitudinal passage therein, a portion of reduced diameter at one end of said longitudinal passage providing an entrance of reduced size to said longitudinal passage and a shoulder within said longitudinal passage, said wrist pin having a second passage therein extending transversely from said longitudinal passage through the exterior of said wrist pin, a connecting rod having a portion extending through said second passage, said portion having an opening in general alignment with said longitudinal passage, a tapered key insertable through said entrance disposed within said longitudinal passage and extending into said opening in said portion of said connecting rod, and a spring for biasing said key to engagement with said connecting rod portion adjacent said opening, said spring having at least one turn at one end thereof of diameter greater than the smallest dimension of said entrance bearing upon said shoulder.

2. In a wrist pin and connecting rod assembly for compressors and the like, a wrist pin having a longitudinal passage therein, a reduced portion at one end of said longitudinal passage providing an entrance to said longitudinal passage smaller in transverse cross section than said longitudinal passage and a shoulder within said longitudinal passage, said wrist pin having a second passage therein extending transversely from said longitudinal passage through the exterior of said wrist pin, a connecting rod extending through said second passage and having an opening therethrough in general alignment with said longitudinal passage, a tapered key insertable through said entrance disposed within said longitudinal passage and extending through said opening in said connecting rod, a helical spring for biasing said key to engagement with said connecting rod adjacent said opening, said spring having one turn larger in diameter than the smallest dimension of said entrance and the remander of turns smaller in diameter than the smallest dimension of said entrance, said spring being disposed in compressed condition with one end thereof bearing against said key and the other end thereof bearing against said shoulder.

MARVEL A. ELLIOTT.

References Cited in the file of this patent

UNITED STATES PATENTS

| Number | Name | Date |
|---|---|---|
| 1,152,876 | Brown et al. | Sept. 7, 1915 |
| 1,480,185 | Setter | Jan. 8, 1924 |
| 1,558,444 | Joseph | Oct. 20, 1925 |
| 1,830,814 | Thiry | Nov. 10, 1931 |
| 1,921,607 | Curtis | Aug. 8, 1933 |
| 2,008,772 | Robertson | July 23, 1935 |
| 2,383,836 | Adams | Aug. 28, 1945 |
| 2,394,409 | Steenstrup | Feb. 5, 1946 |
| 2,546,045 | Scheldorf | Mar. 20, 1951 |
| 2,554,992 | Kurtz | May 29, 1951 |